United States Patent [19]
Wunner et al.

[11] Patent Number: 5,423,614
[45] Date of Patent: Jun. 13, 1995

[54] SELF ALIGNING REMOVABLE BEARING CARRIER FOR A LIQUID RING VACUUM PUMP

[75] Inventors: Charles H. Wunner; T. M. Wallace, both of Charlotte, N.C.

[73] Assignee: Vooner Vacuum Pumps, Inc., Charlotte, N.C.

[21] Appl. No.: 168,462

[22] Filed: Dec. 16, 1993

Related U.S. Application Data

[63] Continuation-in-part of Ser. No. 904,987, Jun. 26, 1992, Pat. No. 5,328,274.

[51] Int. Cl.⁶ .............................................. F16C 35/00
[52] U.S. Cl. ....................................... 384/428; 384/584
[58] Field of Search ............... 384/275, 295, 296, 428, 384/438, 439, 440

[56] References Cited

U.S. PATENT DOCUMENTS

| | | | |
|---|---|---|---|
| D. 297,942 | 10/1988 | Somarakis | D15/143 |
| 496,347 | 4/1893 | Copeland | 384/584 |
| 1,350,245 | 8/1920 | Stachowski | 384/434 |
| 1,678,968 | 7/1928 | Allen | 384/444 |
| 1,743,683 | 1/1930 | Payne | 384/434 |
| 2,191,890 | 2/1940 | Le Bus | 384/442 |
| 3,770,109 | 11/1973 | Kraft | 384/428 X |
| 4,004,644 | 1/1977 | Lijekvist | 384/418 X |
| 4,747,752 | 5/1988 | Somarakis | 417/68 |
| 5,099,707 | 3/1992 | Tori et al. | 384/296 X |
| 5,129,737 | 7/1992 | Stenner | 384/428 X |

*Primary Examiner*—Thomas R. Hannon
*Attorney, Agent, or Firm*—Ralph H. Dougherty; Scott E. Hanf

[57] ABSTRACT

A bearing housing, particularly for a liquid ring vacuum pump, having two cylindrical aligning members and the housing with two cylindrical groove-containing receiving members which provides self alignment of the bearing bracket with respect to the liquid ring vacuum pump.

14 Claims, 5 Drawing Sheets

SELF ALIGNING REMOVABLE BEARING CARRIER FOR A LIQUID RING VACUUM PUMP

CROSS REFERENCE TO RELATED APPLICATION

This application is a continuation-in-part application of our U.S. patent application Ser. No. 07/904,987, filed Jun. 26, 1992 U.S. Pat. No. 5,328,274.

FIELD OF THE INVENTION

The present invention relates to liquid ring vacuum pumps or compressors, and more particularly to a bearing housing structure and a method for easy and accurate installation of bearings, as well as quick removal and reinstalling of bearings to their original alignment in the case of bearing failure on an operating pump or other emergency.

BACKGROUND OF THE INVENTION

A liquid ring vacuum pump or compressor apparatus has sequentially an inlet segment, a compression segment, a discharge segment, and a seal segment. The pump includes a generally annular housing having a longitudinal axis; a rotor shaft journaled for rotation in bearings within fixed bearing housings external to the pump housing; a rotor mounted on the shaft for rotation within the housing and having radially extending vanes forming a plurality of working chambers; and a port-containing cone member through which a pumped medium is admitted to and discharged from the working chambers. Pump heads which include fixed bearing housings have the advantage that the bearing location is fixed radially in relation to the axis of the cone, for control of centered position of the rotor mounted on the shaft in relation to the cone mounted on the head. Pump heads with a fixed bearing design have the disadvantage that it is necessary to disassemble the pump to change the bearing. This bearing change procedure is time consuming and costly, especially if the pump is required for production.

Removable bearing brackets on prior and current pump designs have made it possible to change a bearing without disassembling the pump. This has been desired when considering making a quick change of bearings on a pump that is installed for production.

When major bearing failure causes damage to the bearing housing, a removable bearing bracket can be replaced and save the expense of replacing an entire head.

In the past, liquid ring vacuum pumps have incorporated removable bearing brackets of various designs. The most common design is a four arm design mounted to the side of the head. The plane of interface between this bearing bracket and head is vertical and perpendicular to the axis of the pump. The weakness of the design is the lack of positive reference to the center of the cone mounted in the head and the lack of control of infinite number of radial misalignment positions of the shaft relative to the center of the cone mounted on the inside of the head, in the reassembly of the pump. Another weakness of four arm design is that all the static load is held by bolts parallel to the axis of the pump. The tightness of these bolts holds the alignment position of the bearing bracket to the head.

In U.S. Pat. No. Des. 297,942, the inventor, Somarakis, has the bearing bracket interface to the head on a single horizontal plane. This single reference plane controls the elevation of the bearing, but uses machined circles, with inherent tolerances, in each bearing bracket to independently control both the horizontal position, and axis angle in aligning each end of the shaft to the central axis of the cones mounted in the heads. These same machined circles, with their inherent tolerances, in each bearing bracket control the axial in and out position of the two bearing centers. All of the vertical static load is supported and transferred from the bracket to the head in a horizontal plane and parallel to the axis of the pump.

DESCRIPTION OF THE PRIOR ART

Applicants are aware of the following U.S. patents concerning liquid ring pumps:

| U.S. Pat. No. | Inventor | Issue Date | Title |
| --- | --- | --- | --- |
| Des. 297,942 | Somarakis | 10-04-1988 | BEARING HOUSING |
| 496,347 | Copeland | 04-25-1893 | JOURNAL BEARING |
| 1,350,245 | Stachowski | 08-17-1920 | BEARING |
| 1,678,968 | Allen | 07-31-1928 | TURBINE CYLINDER SUPPORT |
| 1,743,683 | Payne | 01-14-1930 | DRIVING MECHANISM FOR SNOWPLOWS |
| 2,191,890 | Le Bus | 02-27-1993 | SHAFT BEARING |
| 4,004,644 | Liljekvist | 01-25-1977 | ROLLER CUTTER |
| 4,747,752 | Somarakis | 05-31-1988 | SEALING AND DYNAMIC OPERATION OF A LIQUID RING PUMP |

Somarakis U.S. Pat. No. Des. 297,942 teaches an ornamental design for a bearing housing for a liquid ring vacuum pump. Note that this design does not have any provision to be self-aligning.

Copeland U.S. Pat. No. 496,347 teaches a journal bearing. There is no mention of any application to liquid ring vacuum pumps. A claim is made that the invention will self-adjust the axle or shaft but unlike Applicants' invention, no provision is made for self alignment of the device itself.

Stachowski U.S. Pat. No. 1,350,245 teaches an apparatus for a frangible bearing bracket which is designed to break when the load support from the shaft becomes excessive in order to save the more expensive parts of the bearing. Note that this unit incorporates at least five separate pieces and does not have a self-alignment feature.

Allen U.S. Pat. No. 1,678,968 teaches an apparatus for turbine-cylinder support. It is obvious from the drawings of this patent does not relate to a liquid ring vacuum pump nor is the support disclose, a unitary member.

Payne U.S. Pat. No. 1,743,683 teaches a drive mechanism for snow plows this unit is not designed for use with liquid ring vacuum pumps, nor is the bearing bracket of unitary design.

Le Bus U.S. Pat. No. 2,191,890 teaches a shaft bearing. Note that this bearing shaft has only horizontal bolt holes configured for accepting vertical bolts.

Liljekvist U.S. Pat. No. 4,004,644 teaches an apparatus for a roller cutter and has no applications to liquid ring vacuum pumps or bearing brackets configured to journal a shaft.

Somarakis U.S. Pat. No. 4,747,752 shows the current state of the art in bearing housings for liquid ring vacuum pumps as depicted in FIGS. 1 and 2 therein.

SUMMARY OF THE INVENTION

The invented removable bearing bracket includes a pair of cylindrical aligning guides which provide horizontal as well as vertical support. The removable bearing bracket provides an axial stop at one end with the vacuum pump's receiving bracket providing another axial stop.

Alignment of the bearing to the central axis of the two cones of the pump is controlled by the cylindrical fit of the guide members. The fit is machined and tight, the cylindrical guides will not accept the bracket unless it is aligned axially correct when it is inserted into the guide receiving means on the vacuum pump. The mounting plate stop member, vertical and perpendicular to the central axis controls the in and out axial position of the bearings, and maintains the specified distance between the two bearing centers.

All of the vertical static load is supported and transferred from the bearing bracket to the head in a combination of horizontal and angular planes while keeping the load support parallel to the axis of the pump.

OBJECTS OF THE INVENTION

The principal object of the invention is to provide a self-aligning, removable bearing bracket for a horizontal shaft.

It is also an object of this invention to provide means for positively controlling the alignment of a removable bearing bracket or housing without requiring the use of special tools.

It is also an object of the invent ion to provide self-aligning or self centering of the two bearing housing bores, which is also the shaft centerline, to the centerline of the cones.

It is also an object of the invention to provide by the shape of the cylindrical guide, gravity force to work to self-align or self-center the bearing bores even during operation subjected to vibrations.

Another object of the invention is to provide positive axial, in and out, location of bearing housing to the head.

Another object of the invention is to provide a relatively small (in relation to head size) cast bearing housing that is simple to repair or relatively inexpensive to replace if severely damaged beyond repair.

It is also an object of the invention to provide a pump housing head in which the working part is separable from the support parts.

BRIEF DESCRIPTION OF THE DRAWINGS

The foregoing and other objects will become more readily apparent by referring to the following detailed description and the appended drawings in which.

DETAILED DESCRIPTION

Figure 1:
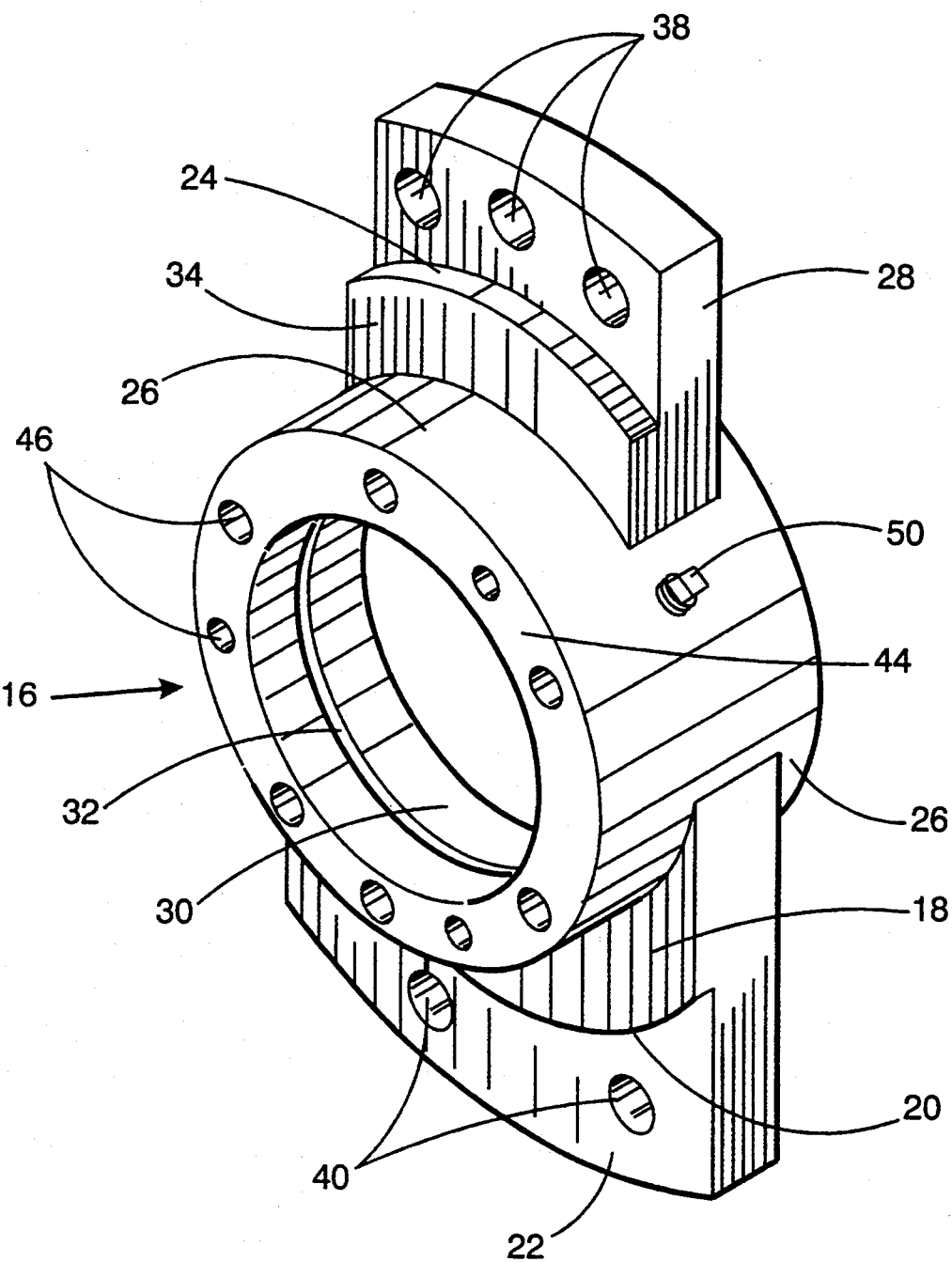
FIG. 1 is an isometric view of a bearing bracket in accordance with the invention.

Referring now to the drawings, a liquid ring pump 10 includes a shaft 12 connected to an associated drive means, not shown, the shaft extending along a longitudinal axis through pump housing 14. The shaft is journaled for rotation in bearing housings 16 mounted on the head 17 at each end of the pump housing.

The invented bearing housing 16, as best shown in FIG. 1, has a bearing mounting 26 and two associated vertical mounting plates 22 and 28. Each mounting plate has a lip 18 and 34 with a smooth, preferably machined, cylindrical surfaces. Depending upwardly from vertical mounting plate 28, lip 34 has a top surface 24 extending upwardly to form a cylindrical engagement member. Depending upwardly from the vertical mounting plate 22, is lip 18 which has a bottom surface 20. Horizontal mounting means such as bolt holes 40 are provided on each side of the vertical mounting plate 22. Three such vertical holes 40 are shown in the mounting plate 22, however more or less mounting holes may be used, if desired (see FIG. 2). Upstanding from base 18 and aligned on the vertical axis of the bearing housing are bearing mounting 26 and associated vertical mounting plate 28. Bearing mounting 26, which extends beyond mounting plate 28 as shown in FIG. 1, and includes a cylindrical bore 30 having a lubrication groove 32 therein for oil or grease. The lubrication groove 32 is accessible through lube port 50. Top mounting holes 38 are provided in the vertical mounting plate above the bore and on the vertical centerline of the housing 16, as shown in FIG. 1.

Machined bearing mounting face 44 is provided with holes 46 for installation of a bearing cap on the bearing housing, holes 46 preferably being threaded to receive bolts.

Figure 3:
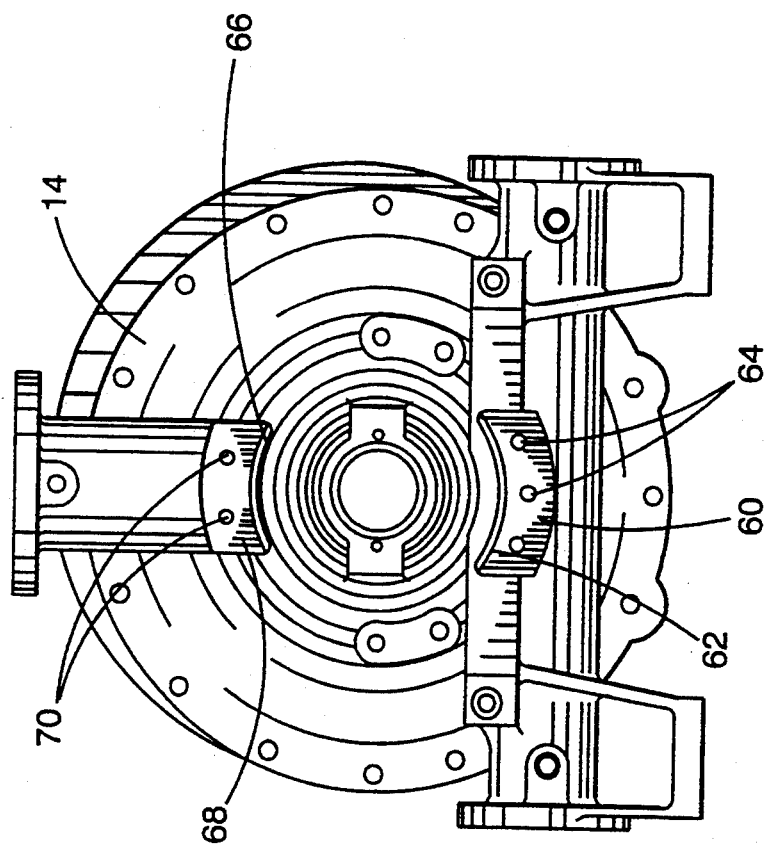
FIG. 3 is a right hand end view of the vacuum pump of FIG. 2 without the invented bearing housing installed on the end thereof.

Housing 16 rests between bearing support heads 62 and 66, FIG. 3, which have a smooth, preferably machined, cylindrical top and bottom surfaces for receiving mating bases 34 and 18.

The interplay of smooth, machined, cylindrical surfaces on the bearing bracket and vacuum pump transfers the static and dynamic load of the bearing to the head. These bearing surfaces are clean, machined surfaces with no gaskets. Continuous contact of the bearing bracket to the mating and supporting head surface insures equal distribution of load, with minimal distortion of the bracket under dynamic loading, and maintains the engineered standard fit as originally manufactured.

The pair of cylindrical surfaces at the back of the bracket control an infinite number of points on the cylindrical surfaces 20 and 24 which are equidistant from a point that coincides with the centerline of the shaft and cone. A sufficient axial length of engagement between the two cylindrical mating surfaces on the bracket 20 and 24, FIG. 6 mating with bearing support heads 62 and 66, to provide a close tolerance fit, producing both radial and angular self alignment with no additional external adjustment. The depth of cylindrical surfaces 20 and 24 are must be greater than the tolerance of the circular fit however much greater depths do not produce any benefit as the alignment of the bracket. Therefore in a typical application the depth of a quarter (¼) inch (0.635 centimeters) may be sufficient whereas a depth of two (2) inches (5.08 centimeters) or more would not provide any alignment benefit.

The pair of cylindrical surfaces at the back of the bracket control the side to side position or horizontal alignment of the bearing in relation to the central axis of the internal operating cones of the pump, as well. The two concentric cylindrical surfaces, having been machined for a very close tolerance fit, provide radial and angular self-alignment when cylindrical surfaces 20 and 24, FIG. 1, is assembled into cylindrical receiving surfaces 62 and 66, FIG. 3. There is rotational movement about the axis which allow precise alignment with the bolt holes.

The upper and lower cylindrical alignment members 34 and 18, FIG. 1, are attached to mounting plates 28 and 22, which in conjunction with pump surfaces 68 and 60, control the in and out position or axial distance alignment of the bearing in relation to the end to end separation of the two internal operating cones of the pump.

Figure 2:
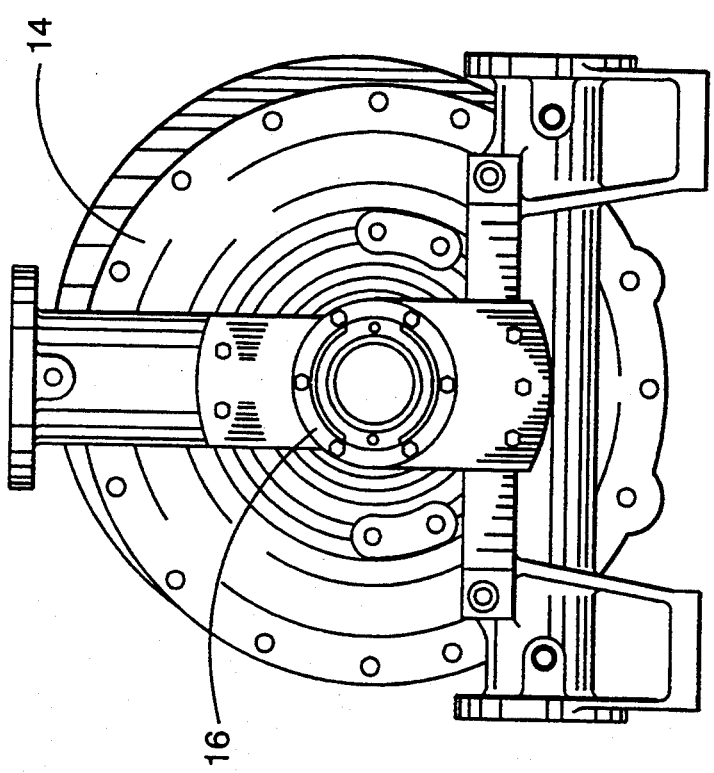
FIG. 2 is a left hand end view of a vacuum pump with the invented bearing housing installed on the end thereof.
Figure 4:
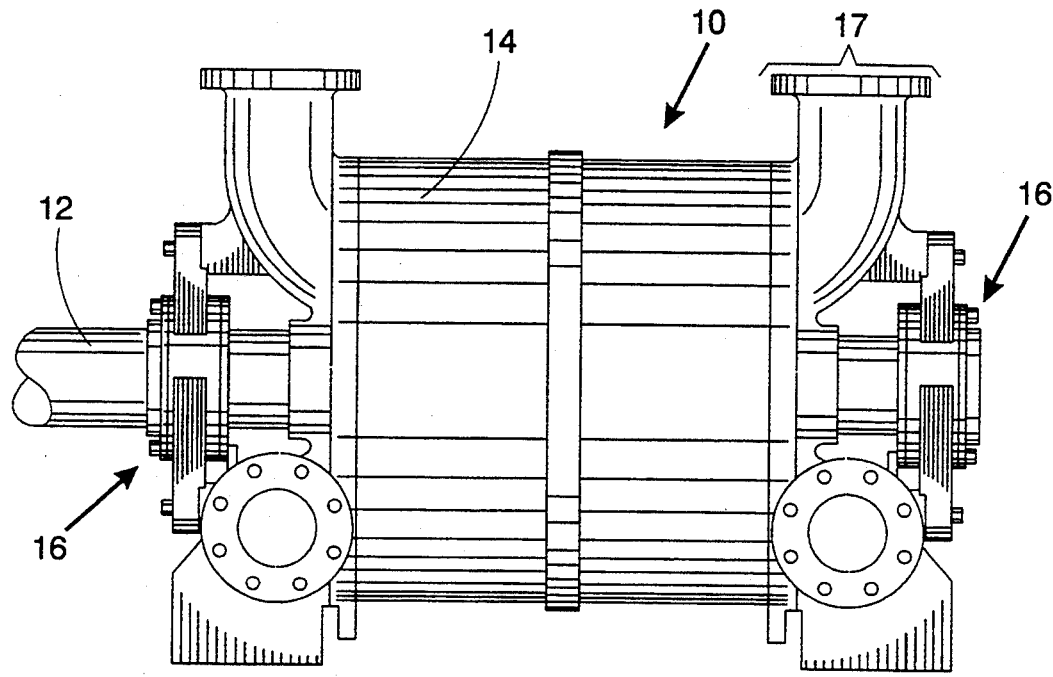
FIG. 4 is a side view of the liquid ring vacuum pump shown in FIG. 2.
Figure 5:
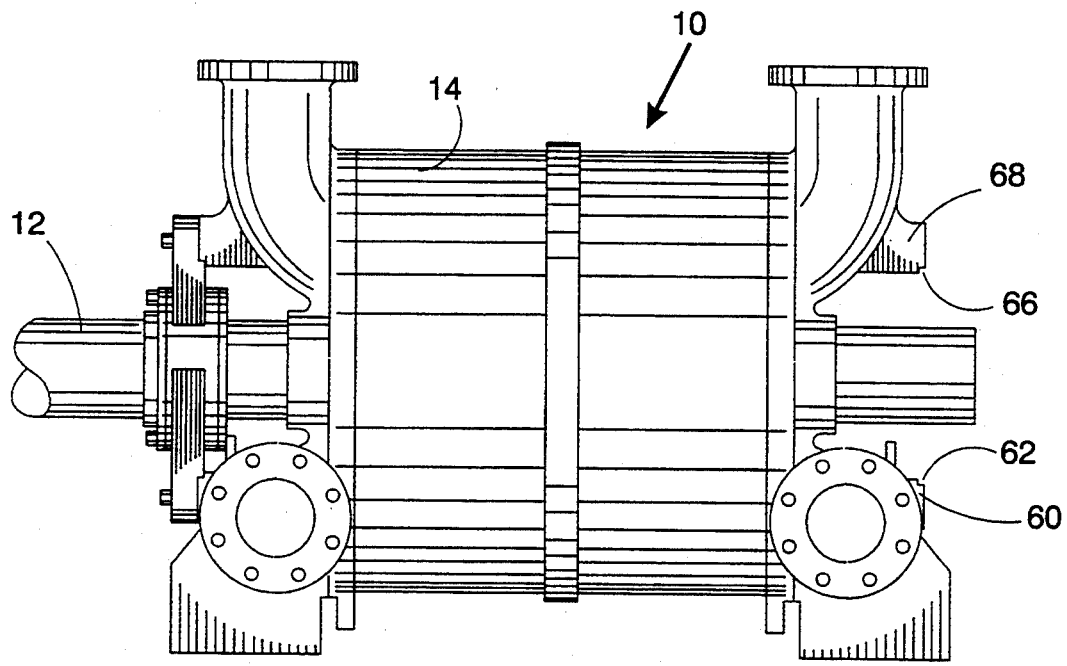
FIG. 5 is a side view of the liquid ring vacuum pump of FIG. 2 with the bearing housing removed from the right side thereof.
Figure 6:
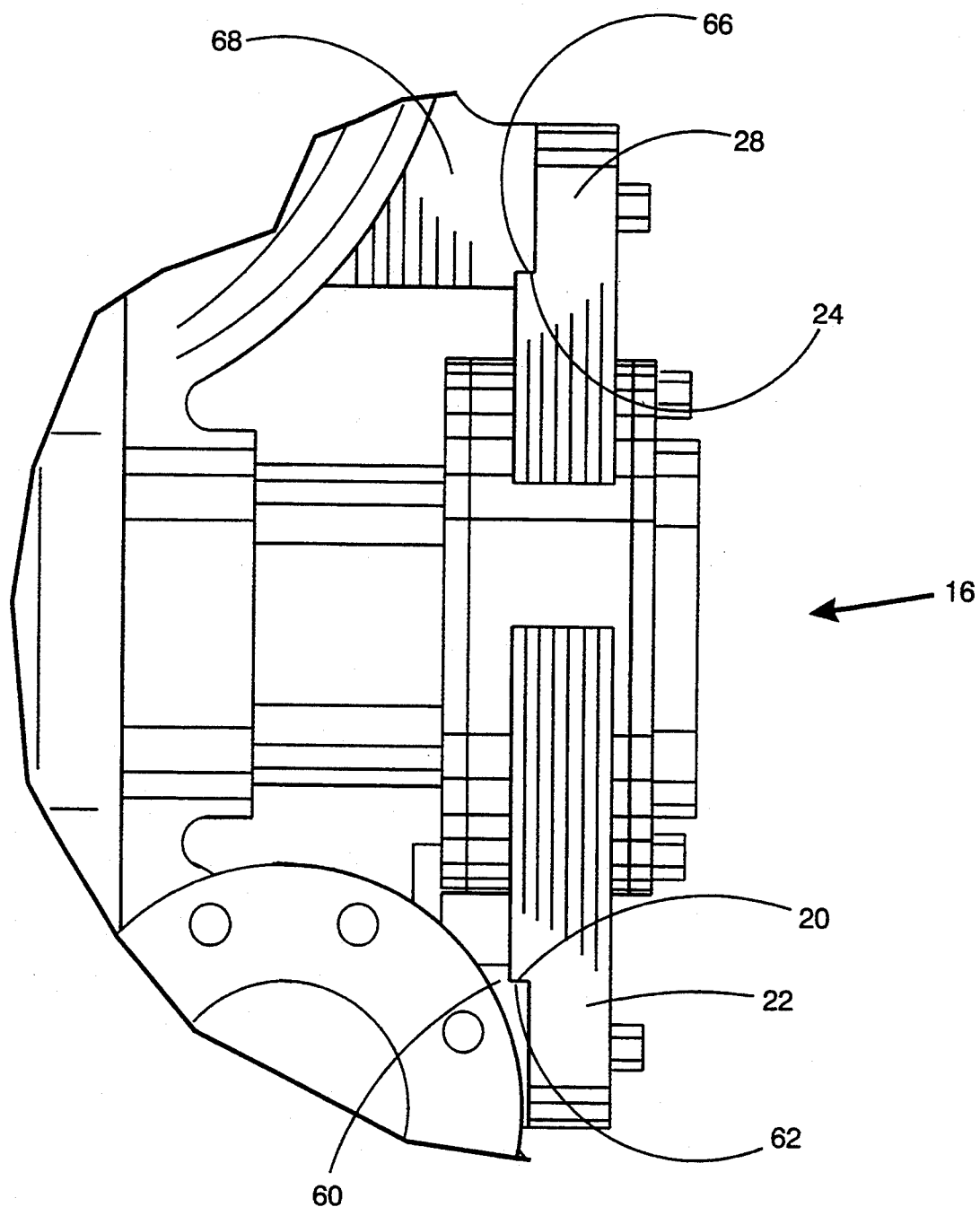
FIG. 6 is an enlarged side view of a portion of the liquid ring vacuum pump and bearing bracket shown in FIG. 4.

In operation, the bearing bracket is situated with cylindrical positioners 34 and 18, FIG. 1, in between faces 66 and 62 of bearing supports 68 and 60, FIG. 5. This allows cylindrical surface 24 to be in direct contact with face 66 of bearing support 68 and cylindrical surface 20 to be in direct contact with face 62 of bearing support 60 as shown in FIG. 6. Mounting plates 28 and 22, FIG. 1, provide an axial stop along with bearing supports 68 and 60, FIG. 3. The bearing housing is then fixed to the pump by placing bolts through holes 38 and 40, FIG. 1, in the vertical mounting plates 28 and 22 and securing them to the pump in bolt receptacles 70 and 64, FIG. 3. The housing 16 is properly aligned for operation without necessity for further action as shown in FIG. 2. If it becomes necessary to replace a bearing or housing during operation, the procedure is the same, which assures accurate alignment at all times.

The attachment locations 64 and 70 form a trapezoid within which nearly all of the torque forces are situated, which helps to stabilize the pump when in operation.

ALTERNATIVE EMBODIMENTS

Figure 7:
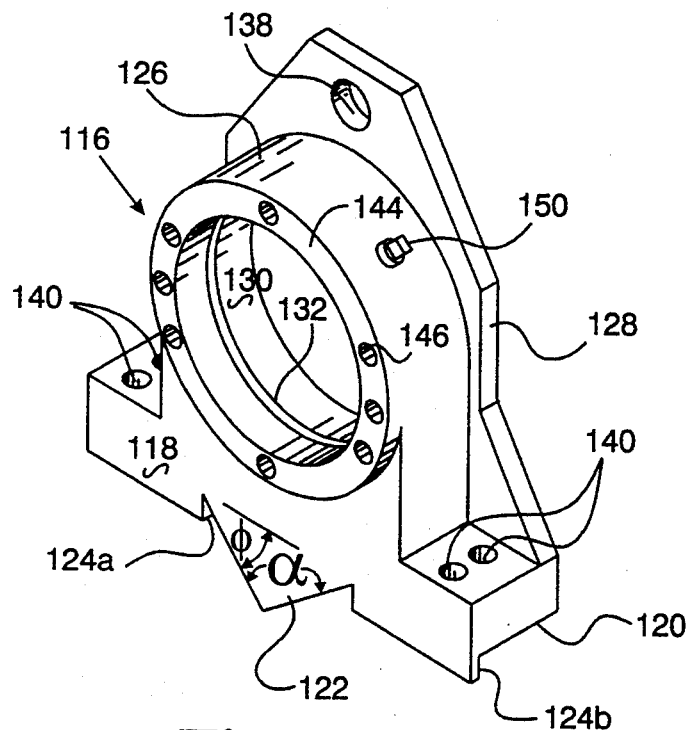
FIG. 7 is an isometric view of an alternative embodiment of the invented bearing bracket showing the lubrication port.

Alternatively, the invented bearing housing 116, as best shown in FIG. 7, has a base or pedestal 118 with a smooth, preferably machined, bottom surface 120 on its underside. Extending downwardly from the base 118 is an angled central axial aligner member 122. The angle $\Phi$ can vary from 30 to 60 degrees from the horizontal, but generally is 45 degrees. The total angle $\alpha$ can vary from 60 to 120 degrees, but generally is 90 degrees. Depending downwardly from each side of the pedestal and flanking the central aligner 122 are locator stops 124a and 124b. Upstanding from pedestal 118 and aligned on the vertical axis of the bearing housing are bearing mounting 126 and associated vertical mounting plate 128. Bearing mounting 126, which extends beyond mounting plate 128, includes a cylindrical bore 130 having a lubrication groove 132 therein for oil or grease. Lubrication groove 132 is accessible through lube port 150. A top mounting hole 138 is provided in the vertical mounting plate above the bore and on the vertical centerline of the housing 116. Vertical mounting means such as bolt holes 140 are provided on each side of the pedestal 118. Four such vertical holes 140 are shown in the pedestal base, however only two may be provided, if desired, one at each end of the pedestal. The self alignment means for this bracket are more fully described in co-pending application Ser. No. 07/904,987, filed Jun. 26, 1992, which is incorporated herein by reference.

Machined bearing mounting face 144 is provided with holes 146 for installation of a bearing cap on the bearing housing, holes 146 preferably being threaded to receive bolts.

Figure 8:
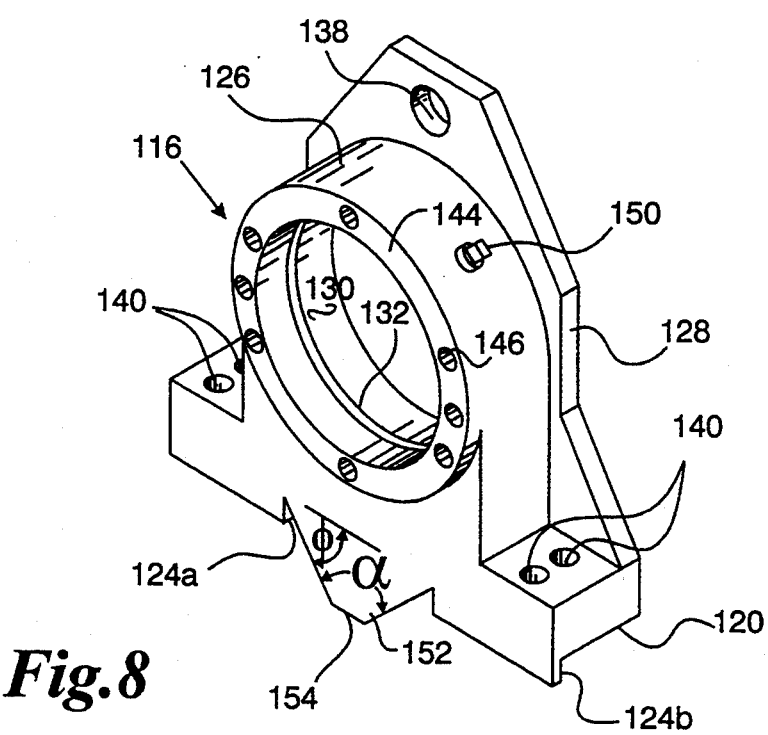
FIG. 8 is an isometric view of an alternative embodiment of the invented bearing bracket shown in FIG. 7, having a modified central alignment member.

A further alternative bearing housing 116, as best shown in FIG. 8, is configured with a base or pedestal 118 having a smooth, preferably machined, bottom surface 120 on its underside. Extending downwardly from the base 118 is an angled central axial aligner member 152 configured as a trapezoid with a flat bottom 154.

SUMMARY OF THE ACHIEVEMENT OF THE OBJECTS OF THE INVENTION

From the foregoing, it is readily apparent that we have invented an improved self-aligning, removable bearing bracket for a horizontal shaft, means for positively controlling the alignment of a removable bearing bracket or housing without requiring the use of special tools, and means for eliminating radial misalignments of such bearings.

It is to be understood that the foregoing description and specific embodiments are merely illustrative of the best mode of the invention and the principles thereof, and that various modifications and additions may be made to the apparatus by those skilled in the art, without departing from the spirit and scope of this invention, which is therefore understood to be limited only by the scope of the appended claims.

What is claimed is:

1. A bearing housing for a liquid ring vacuum pump or compressor apparatus, comprising:
   a cylindrical unitary housing adapted to receive and journal a shaft therein;
   said cylindrical housing having a cylindrical bore with a horizontally oriented axis;
   a first vertical mounting plate and a second vertical mounting plate upstanding from said cylindrical housing;
   said pair of vertical mounting plates are each provided with a cylindrical bearing surface, a first cylindrical bearing surface for one mounting plate and a second cylindrical bearing surface for the second mounting plate;
   said first cylindrical bearing surface extending downwardly for engaging a mating groove in a bearing housing support;
   said second cylindrical bearing surface extending upwardly for engaging a mating groove in a bearing housing support; and
   means for removably attaching said bearing housing to a mating support.

2. Apparatus according to claim 1, wherein said mating support is a pump housing.

3. Apparatus according to claim 2, wherein:
   said first vertical mounting plate has at least one horizontal bolt hole therethrough above said cylindrical bore;

said second vertical mounting plate has at least one horizontal bolt hole therethrough below said cylindrical bore;

said bearing housing and said vertical mounting plates being unitary;

whereby attachment points form a trapezoid within which all torque forces are situated to facilitate stabilization of a shaft journaled in said cylindrical housing.

4. Apparatus according to claim 1, wherein said first cylindrical bearing surface covers an arc of from 40° to 180°.

5. Apparatus according to claim 1, wherein said second cylindrical bearing surface covers an arc of from 10° to 120°.

6. Apparatus according to claim 1, wherein said cylindrical housing has an annular lubrication groove within said cylindrical bore.

7. Apparatus according to claim 6, wherein said cylindrical housing is provided with at least one lubrication port communicating with said annular lubrication groove within said cylindrical bore.

8. A head for closing the end of a cylindrical housing of a liquid ring vacuum pump or compressor apparatus, including a bearing housing support, comprising:

a central cylindrical upper surface of said bearing housing support;

said bearing housing support having a cylindrical bore;

a pump housing having a downwardly extending cylindrical receiving means;

a central cylindrical lower surface of said bearing housing support;

a pump housing having a upwardly extending cylindrical receiving means;

a cylindrical upper and a cylindrical lower projection in said bearing housing support engagable with said cylindrical receiving means in said pump housing;

said cylindrical upper and cylindrical lower projection in said bearing housing support being unitary; and means for securely attaching said bearing housing to said pump.

9. Apparatus according to claim 8, wherein said means for attaching said bearing housing comprises:

a first vertical mounting plate and a second vertical mounting plate;

said first vertical mounting plate having a horizontal bolt hole therethrough above said cylindrical bore; and said second vertical mounting plate having a horizontal bolt hole therethrough above said cylindrical bore;

whereby attachment points form a trapezoid within which all torque forces are situated to facilitate stabilization of a shaft journaled in said cylindrical housing.

10. Apparatus according to claim 8, wherein said first cylindrical bearing surface covers an arc of from 40° to 180°.

11. Apparatus according to claim 8, wherein said lower cylindrical bearing surface covers an arc of from 10° to 120°.

12. Apparatus according to claim 8, wherein said cylindrical housing is provided with an annular lubrication groove within said cylindrical bore.

13. Apparatus according to claim 12, wherein said cylindrical housing is provided with at least one lubrication port communicating with said annular lubrication groove within said cylindrical bore.

14. A bearing housing for a liquid ring vacuum pump, comprising:

a bearing mounting having a cylindrical bore;

a first mounting plate, integral with and extending from said bearing mounting;

a second mounting plate, integral with and extending from said bearing mounting opposite said first mounting plate;

said first mounting plate having a lip with a smooth, cylindrical surface depending upwardly from said first mounting plate;

said second mounting plate having a lip with a smooth, cylindrical surface depending upwardly from said second mounting plate;

said first mounting plate having a horizontal mounting means provided on said first mounting plate;

said second mounting plate having a horizontal mounting means provided on said second mounting plate;

said cylindrical bore having a lubrication groove.

* * * * *